United States Patent
Seo

(10) Patent No.: US 10,821,694 B2
(45) Date of Patent: Nov. 3, 2020

(54) SHOE CUSHIONING MATERIAL AND MANUFACTURING MOLD THEREOF

(71) Applicant: Hong Girl Seo, Busan (KR)

(72) Inventor: Hong Girl Seo, Busan (KR)

( * ) Notice: Subject to any disclaimer, the term of this patent is extended or adjusted under 35 U.S.C. 154(b) by 0 days.

(21) Appl. No.: 16/568,251

(22) Filed: Sep. 12, 2019

(65) Prior Publication Data

US 2020/0001561 A1    Jan. 2, 2020

Related U.S. Application Data

(63) Continuation of application No. PCT/KR2019/002253, filed on Feb. 22, 2019.

(30) Foreign Application Priority Data

Feb. 23, 2018 (KR) .......................... 10-2018-0022175

(51) Int. Cl.
    *B29D 35/00*     (2010.01)
    *B29D 35/02*     (2010.01)
    *A43B 17/00*     (2006.01)
    *A43D 3/02*      (2006.01)
    *B29D 35/12*     (2010.01)

(52) U.S. Cl.
    CPC .................................. *B29D 35/128* (2013.01)

(58) Field of Classification Search
    CPC ..... B29C 70/68; B29C 70/682; B29C 70/681; B29C 70/78; B29C 70/80; B29C 33/12; B29C 33/46; B29C 2037/0042; B29D 35/148; B29D 35/128; B29D 35/0009; B29D 35/0018; B29D 35/0036; B29D 35/0045
    See application file for complete search history.

(56) References Cited

U.S. PATENT DOCUMENTS

| | | | | |
|---|---|---|---|---|
| 1,535,715 A | * | 4/1925 | Canfield | B29C 43/18 264/266 |
| 3,505,436 A | * | 4/1970 | Rutsch | B29C 44/16 264/46.8 |
| 3,663,679 A | * | 5/1972 | Jean-Gabriel et al. | B29C 39/02 264/244 |

(Continued)

FOREIGN PATENT DOCUMENTS

| KR | 10-0367847 B1 | 1/2003 |
|---|---|---|
| KR | 10-0750324 B1 | 8/2007 |

(Continued)

OTHER PUBLICATIONS

PCT International Search Report for PCT/KR2019/002253, dated Jun. 7, 2019.
PCT Written Opinion for PCT/KR2019/002253, dated Jun. 7, 2019.

*Primary Examiner* — Xiao S Zhao
*Assistant Examiner* — Emmanuel S Luk

(57) ABSTRACT

Provided is a mold (4) for manufacturing a shoe cushion (1), the mold (4) comprising: a first mold (5); a second mold (6) seated on the first mold (5) and configured to contain first cavities (6a); a third mold (7) seated on the second mold (6) and configured to contain second cavities (7a), wherein the second cavities (7a) are smaller than the first cavities (6a) of the second mold (6); a fourth mold (8) seated on the third mold (7); and one or more air vents (9) formed between the first mold (5) and the second mold (6).

2 Claims, 6 Drawing Sheets

(56) References Cited

U.S. PATENT DOCUMENTS

| | | | | |
|---|---|---|---|---|
| 3,855,657 A * | 12/1974 | Mazzotta | A43B 1/04 12/142 RS |
| RE29,041 E * | 11/1976 | Fukuoka | A43B 1/14 36/11.5 |
| 4,114,213 A * | 9/1978 | Beernaerts | A47C 7/18 264/257 |
| 4,207,278 A * | 6/1980 | Cowen | B29C 44/16 264/46.4 |
| 4,364,763 A * | 12/1982 | Rennerfelt | C03B 19/06 264/1.7 |
| 6,000,923 A * | 12/1999 | Lo | B29C 33/26 249/172 |
| 9,937,644 B2 * | 4/2018 | Hochdoerffer | B29D 35/146 |
| 2002/0100538 A1 * | 8/2002 | Matsunaga | B29D 30/0606 156/128.6 |
| 2002/0167119 A1 * | 11/2002 | Hemphill | B29C 70/547 264/510 |
| 2002/0185766 A1 * | 12/2002 | Daihisa | B29C 45/14065 264/39 |
| 2003/0098118 A1 * | 5/2003 | Rapaport | D04B 21/16 156/221 |
| 2004/0089965 A1 * | 5/2004 | Malfliet | B29C 44/582 264/46.6 |
| 2010/0028609 A1 * | 2/2010 | Sato | B29C 44/0407 428/159 |
| 2011/0163485 A1 * | 7/2011 | Yea | B29C 51/10 264/570 |
| 2012/0091627 A1 * | 4/2012 | Schibsbye | B29C 70/443 264/258 |
| 2013/0154154 A1 * | 6/2013 | Rodman | B29C 51/14 264/257 |
| 2013/0276333 A1 * | 10/2013 | Wawrousek | B29D 35/148 36/102 |
| 2015/0024187 A1 * | 1/2015 | Kutluoglu | B29C 44/146 428/220 |
| 2015/0086664 A1 * | 3/2015 | Zhang | B29D 30/0606 425/28.1 |
| 2015/0097314 A1 * | 4/2015 | Sasaki | B29D 30/0606 264/326 |
| 2015/0115505 A1 * | 4/2015 | Jones | B29C 70/443 264/511 |
| 2016/0031164 A1 * | 2/2016 | Downs | B29C 66/4332 428/12 |
| 2018/0243954 A1 * | 8/2018 | Beamish | B29C 33/10 |
| 2019/0193355 A1 * | 6/2019 | Ohara | B29C 35/02 |
| 2019/0239596 A1 * | 8/2019 | Ploem | A43B 13/02 |
| 2019/0284778 A1 * | 9/2019 | Fagan | E02D 29/1454 |
| 2019/0366592 A1 * | 12/2019 | Ohara | B29C 33/10 |

FOREIGN PATENT DOCUMENTS

| | | |
|---|---|---|
| KR | 10-0869593 B1 | 11/2008 |
| KR | 10-1146554 B1 | 5/2012 |
| KR | 10-1206999 B1 | 11/2012 |
| KR | 10-1245973 B1 | 3/2013 |
| KR | 10-2013-0130270 A | 12/2013 |
| KR | 30-0795831 S | 5/2015 |
| KR | 20-2018-0000419 A | 2/2018 |

* cited by examiner

SHOE CUSHIONING MATERIAL AND MANUFACTURING MOLD THEREOF

CROSS REFERENCE TO RELATED APPLICATIONS

This application is a continuation of International Application No. PCT/KR2019/002253 filed on Feb. 22, 2019, which claims priority to Korean Application No. 10-2018-0022175 filed on Feb. 23, 2018, which are herein incorporated by reference in their entirety.

TECHNICAL FIELD

The present invention relates to a mold for manufacturing shoe cushions, and more particularly to a mold for manufacturing shoe cushions capable of preventing contamination, discoloration and damage of cushions applied to various shoes such as jogging shoes, running shoes, and hiking shoes, thus increasing durability.

TECHNICAL BACKGROUND

In general, soles of athletic shoes are formed by bonding an outsole (sole), a surface of which is provided with a non-slip protrusion means, to a foam, such as EVA or PU, so as to impart friction force to a surface of the foam. Since a cushioning effect of shoes depends on elasticity of a foamed midsole itself, the cushioning effect is not sufficient. In addition, since the front of a shoe where the toe is located does not have sufficient landing effect to the ground, a slip phenomenon frequently occurs through the shoe when walking uphill. Accordingly, in terms of safety, there was a need for improvement.

The most important functional elements in such athletic shoes are excellent landing friction force to the ground when a shoe wearer steps fast such as walking or jogging; and an excellent cushioning effect when the weight of the wearer is applied to the sole of the shoe. In this case, the wearer can exhibit endurance during walking or jogging for a long time or in a marathon.

In the case of existing shoe soles made of a single material, cushioning and elastic effects of a front axle of a shoe where landing pressure is concentrated are insufficient. In particular, since the front of a shoe where the toe is located does not have sufficient frictional effect to the ground, a slip phenomenon frequently occurs through the shoe when walking uphill. Accordingly, in terms of safety, there was a need for improvement.

Existing shoe cushions having the aforementioned functions are mainly foam-molded using a polyurethane (PU) resin. In the case of cushions made of such a foam material, there is a problem that water or dust penetrates the cushions, so that noise occurs during walking and durability is deteriorated. Accordingly, there is an urgent need for development of a cushion that can address these problems, and a manufacturing mold that can produce the cushion quickly and economically.

PRIOR ART

Korean Patent No. 10-0869593
Korean Patent No. 10-1206999
Korean Utility Model Publication No. 20-2018-0000419

DETAILED DESCRIPTION

Problems to be Solved

Therefore, the present invention has been made in view of the above problems, and it is one object of the present invention to provide a mold for manufacturing shoe cushions that is coupled to the front of a shoe sole, i.e., a forefoot part, so as to improve insufficient cushioning and elastic effects of a forefoot part, upon which landing pressure is concentrated, of existing shoe soles constituted of a single material, wherein the shoe cushion is made of a foam having excellent cushioning effect and elasticity and an outer surface of the cushion is closely wrapped with a coating material.

Solution to Solve the Problem

In an embodiment of the present invention, provided is a mold (4) for manufacturing a shoe cushion (1), the mold (4) comprising: a first mold (5); a second mold (6) seated on the first mold (5) and configured to contain first cavities (6a); a third mold (7) seated on the second mold (6) and configured to contain second cavities (7a), wherein the second cavities (7a) are smaller than the first cavities (6a) of the second mold (6); a fourth mold (8) seated on the third mold (7); and one or more air vents (9) formed between the first mold (5) and the second mold (6).

The second mold (6) and the third mold (7) are integrated into a single body, forming an integrated side mold (10). A step (11) is formed at the side molds (10) at a given level where a bottom surface of the fourth mold (8) is located.

The fourth mold (8) is located on the side molds (10) and further extends downward over a side surface of the side molds (10) to the given level. The step is formed on the side surface of the side molds (10) and formed between the given level and a top of the first mold (5).

Advantages of Invention

As apparent from the fore-going, a shoe cushion manufactured using a manufacturing mold of the present invention is entirely wrapped with a coating material made of a thermo polyurethane (TPU) resin, except for a portion of an upper part of an outer surface of the shoe cushion. Accordingly, noise generation during walking due to water or dust penetrated into the cushion can be prevented. In addition, sides of the cushion exposed to the outside can be protected against contamination, discoloration, and damage due to scratches, thereby greatly increasing lifespan thereof. In addition, a cushioning function of the shoe cushion can be kept for a long time.

EMBODIMENTS

Hereinafter, particulars for the practice of the invention will be described with reference to the accompanying drawings. A shoe cushion according to the present invention and a mold for manufacturing the shoe cushion have the following functions and configuration features.

A shoe cushion according to the present invention is attached to a sole of a forefoot part, upon which body weight is concentrated during walking, and is manufactured in a long oval shape or a streamlined shape. A coating material is attached to an outer surface of a body of the shoe cushion, except for a portion of an upper surface thereof, thereby preventing penetration of water, dust, etc. thereinto. Accordingly, noise generation and contamination, discoloration, and damage of a cushion side exposed to the outside may be prevented, thereby maximizing durability thereof.

In addition, a manufacturing mold for manufacturing the cushion may be constituted of first to fourth molds. Here, the second and third molds of the first to fourth molds may be integrally formed. A coating material is inserted into a cavity of the mold, and then the coating material is attached to inner walls of the cavity by air suction force through air vents. Next, after injecting a polyurethane resin as a main material, the manufacturing mold is closed with the fourth mold, and foam-molding is completed. As a result, a cushion including the body, an outer surface of which has been adhesively coated with the coating material, is manufactured.

Figure 1:
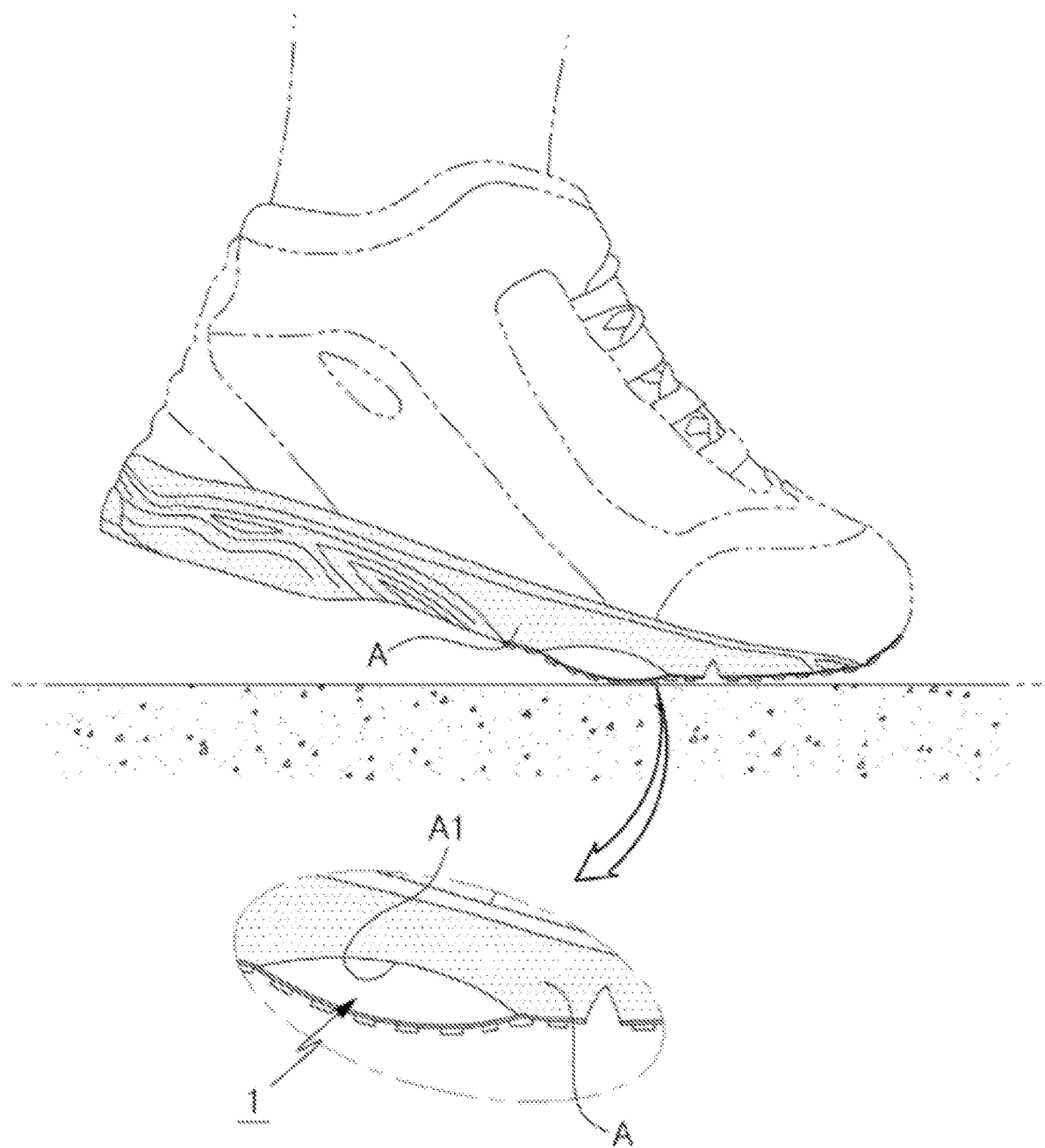
FIG. 1 illustrates a side view of a shoe to which a shoe cushion of the present invention is applied.
Figure 2:
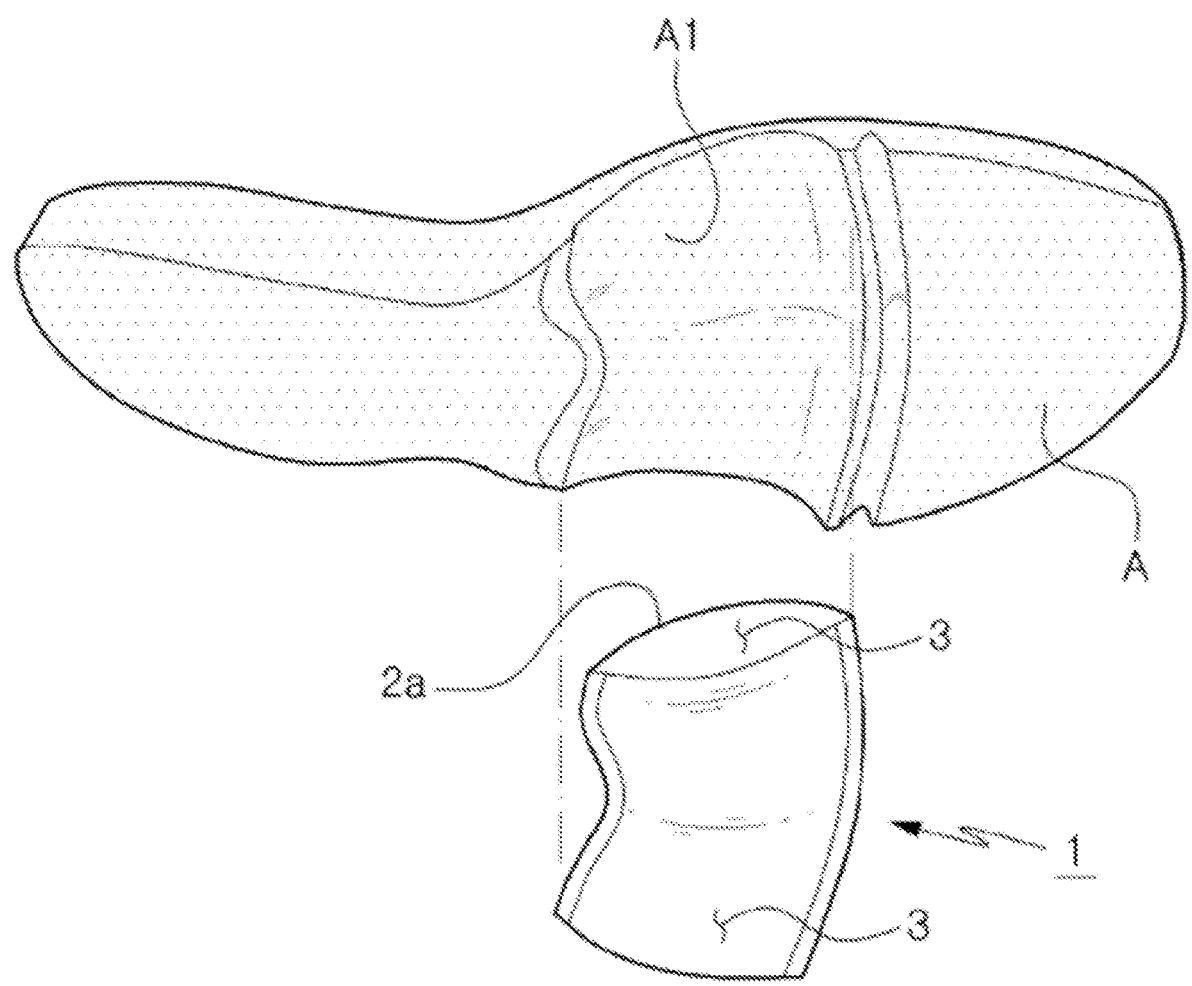
FIG. 2 is a perspective view illustrating a state in which a shoe cushion is separated from a sole.

FIG. 1 illustrates a side view of a shoe to which a shoe cushion of the present invention is applied, and FIG. 2 is a perspective view illustrating a state in which a shoe cushion is separated from a sole. Common shoes are manufactured by attaching a sole A and an outsole to a bottom of an upper leather using a synthetic rubber or a resin so that an entire cushioning effect during walking is provided by the sole A alone.

As shown in the drawings, a general configuration of the sole A of the present invention is formed by attaching, to an arc-shaped recessed portion A1 formed at a sole A of a heel part or forefoot part upon which body weight is concentrated during walking, a cushion that has an attachment surface having the same arc shape as the recessed portion A1. After the attachment, the cushion 1 is formed to protrude farther downward than the sole A so that the cushion 1 first lands on the ground during walking and jogging and, accordingly, a shock absorbing force of alleviating shock transmitted to the body is exerted.

Figure 3:
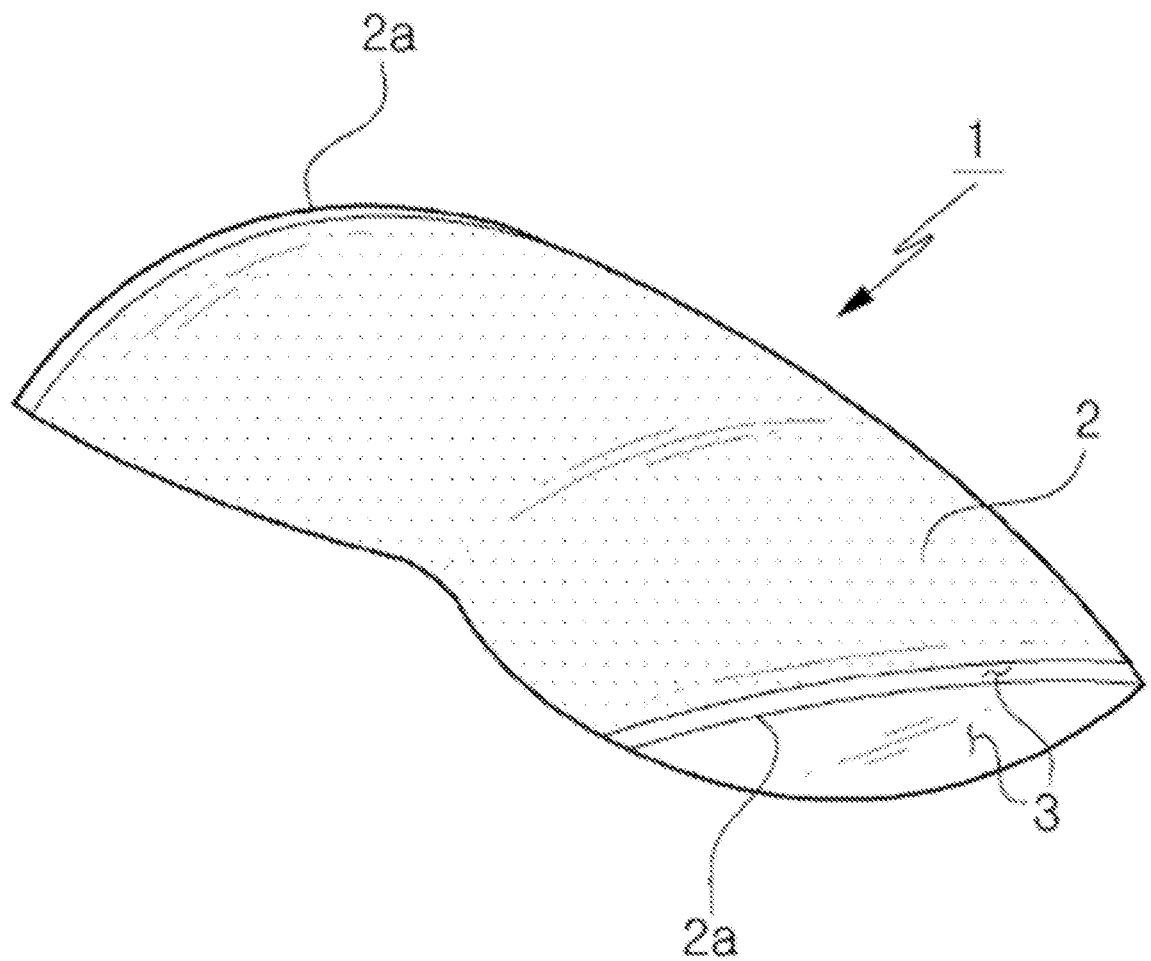
FIG. 3 is a perspective view illustrating a preferred embodiment of a shoe cushion manufactured according to the present invention.
Figure 4:
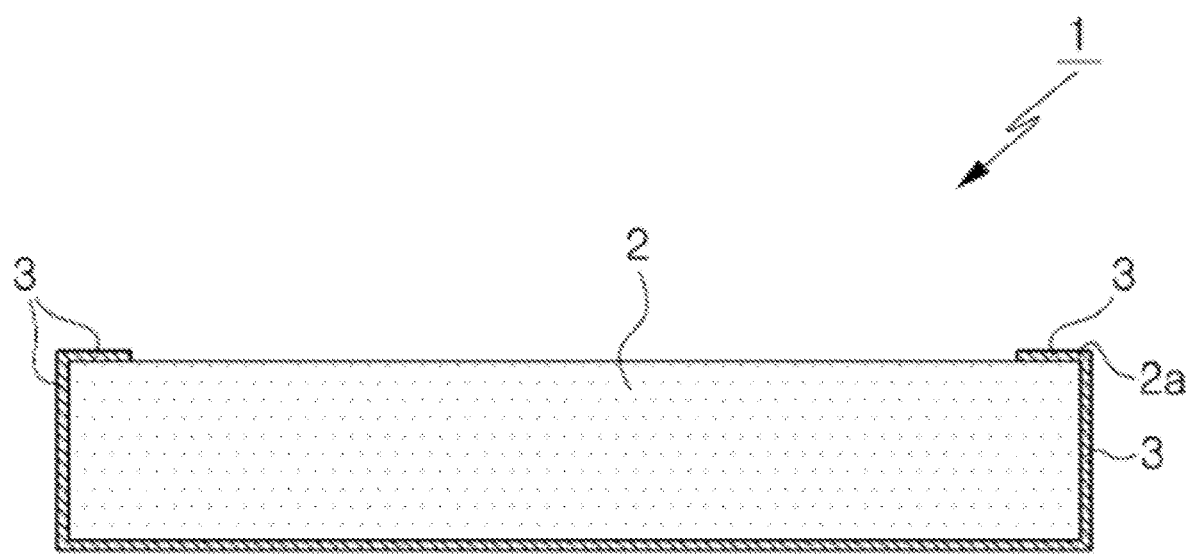
FIG. 4 illustrates a sectional configuration of a shoe cushion according to the present invention.

FIG. 3 is a perspective view illustrating a preferred embodiment of a shoe cushion manufactured according to the present invention, and FIG. 4 illustrates a sectional configuration of the shoe cushion.

As shown in the drawings, a shoe cushion 1 of the present invention may have a streamlined or long oval shape, when viewed at a side thereof, to correspond to an arc shape of a recessed portion formed at the sole. A foam-molded body 2 of the cushion 1 is formed using polyurethane (PU) as a main material. Particularly, an outer surface of the body 2 is coated with a coating material 3 made of thermo polyurethane (TPU) having excellent elasticity and durability, and the cushion 1 is configured to be coupled to the recessed portion A1 formed at the sole.

An entire outer surface of the cushion 1, except for the center of an upper part of the outer surface thereof, is coated with the coating material 3 to wrap the entire surface. In particular, it is important to completely cover upper side edges 2a of the cushion 1 with the coating material 3.

For this, the coating material 3 may be pre-manufactured in the form of a bag with an open top.

Figure 5:
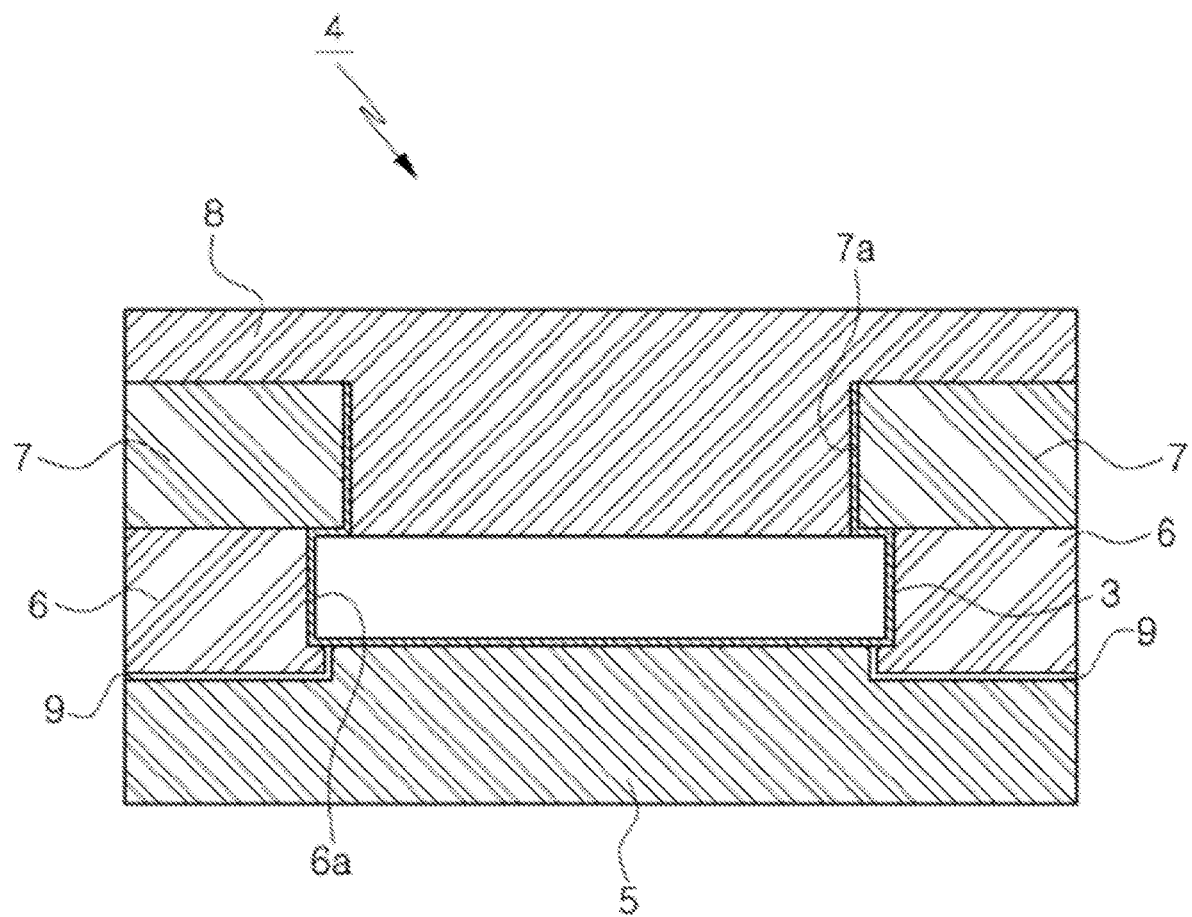
FIG. 5 illustrates a sectional view of a preferred embodiment of a mold for manufacturing shoe cushions according to the present invention.

FIG. 5 illustrates a sectional view of a mold for manufacturing shoe cushions according to the present invention. A mold 4 for manufacturing the cushion 1 of the present invention includes a first mold 5 disposed at the bottom thereof; second molds 6 disposed on opposite sides of the first mold 5, third molds 7 respectively disposed on the second molds 6, and a fourth mold 8 formed on the third molds 7.

Cavities 6a and 7a, in which the cushion 1 are to be foam-molded, are respectively formed between the second molds 6 and between the third molds 7, the second molds 6 and the third molds 7 being seated on the first mold 5. At least one fine air vent 9 is formed between the first mold 5 and the second molds 6.

The air vent 9 is provided to develop and attach the coating material 3, manufactured in a bag shape, to inner walls of the cavities 6a and 7a using air suction force. Detailed descriptions thereof are provided below.

When shown at the front sectional view of FIG. 5, the cavities 7a formed at the third molds 7 are manufactured to be smaller than the cavities 6a formed at the second molds 6 so that upper parts of the cavities 6a of the second molds 6 are in contact with portions of lower surfaces of the third molds 7.

Figure 6:
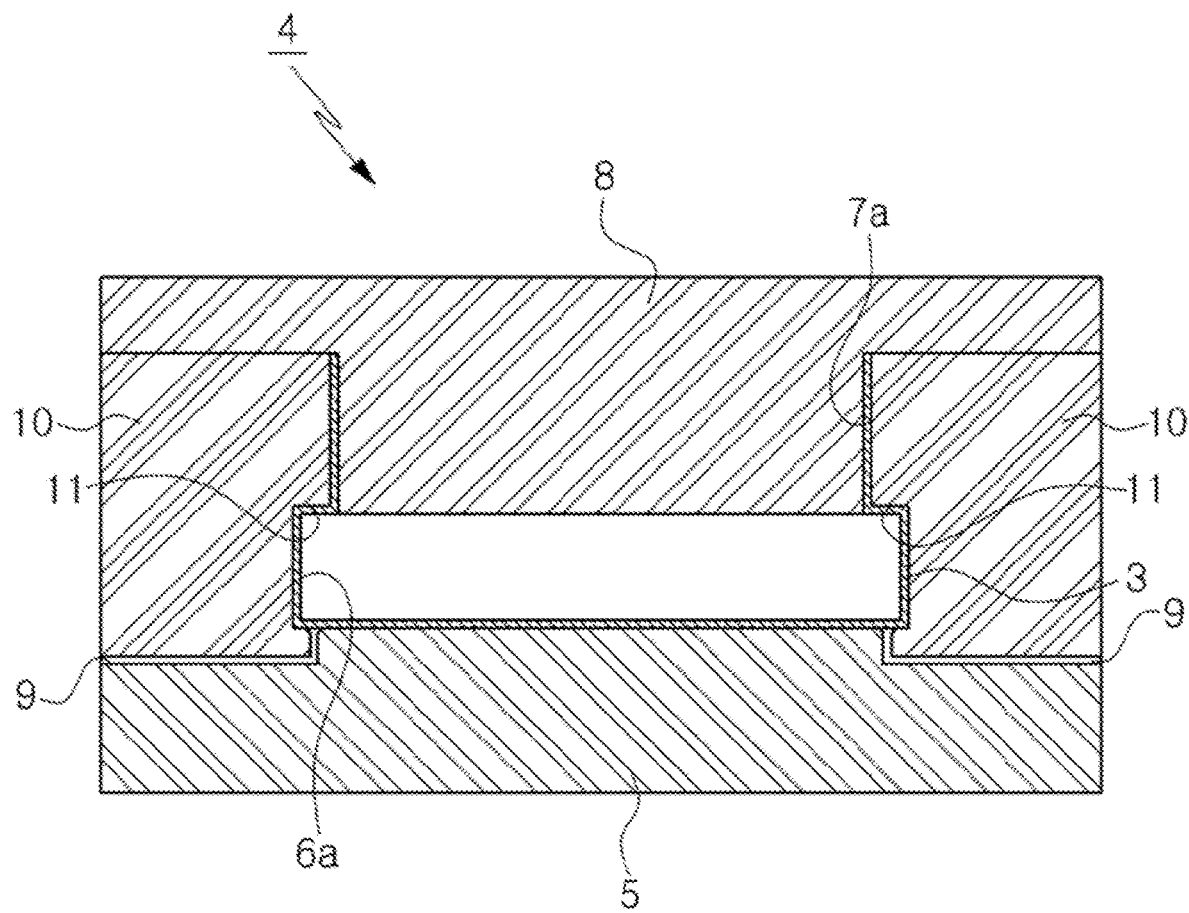
FIG. 6 illustrates a sectional view of another embodiment of a mold for manufacturing shoe cushions according to the present invention.

In another embodiment of the present invention, the second and third molds 6 and 7 seated on the first mold 5 may be integrally manufactured in a single body, thereby constituting side molds 10, as shown in FIG. 6.

In this case, steps 11 are formed at portions of the side molds 10 which are in contact with a bottom surface of the fourth mold 8 so that side edges 2a of the body 2 are covered with the coating material 3.

Such a configuration is possible because a material of the cushion 1, which is a product to be molded, has flexible and compressible characteristics and, accordingly, a foam-molded cushion 1 may be taken out to the outside using only the side molds 10 of the single body having the steps 11 without separation of the second and third molds.

The cushion 1 of the present invention may be manufactured through the following manufacturing processes using the mold 4 for manufacturing shoe cushions of the present invention configured as described above.

In a state in which the fourth mold 8 of the manufacturing mold 4 is opened, the coating material 3 is inserted into the cavities 6a and 7a formed by the first mold 5, the second molds 6, and the third molds 7 such that an opening of the coating material 3 faces upward.

Since the coating material 3 is made of thermo polyurethane (TPU) having excellent elasticity and durability and is manufactured in a bag shape having an open top, the coating material 3 maintains close contact with inner walls of the cavities 6a and 7a while developing to the inner walls when air inside the cavities 6a and 7a is sucked through the air vents 9 between the first mold 5 and the second molds 6 using an air suction device (not shown) after being inserted into the cavities 6a and 7a.

Next, a liquid polyurethane (PU) resin is injected into an inner space of the bag-type coating material 3 tightly inserted into the cavities 6a and 7a of the manufacturing mold 4, followed by closing with the fourth mold 8 and performing foam-molding.

After completing the foam-molding, the fourth mold 8 is opened, and the foam-molded cushion 1 is taken out of the cavities 6a and 7a. As a result, the cushion 1 is coated with the coating material 3 in a shape of wrapping the bottom, sides, and a portion of the top of the body 2. The coating material 3 protruding upward from the cushion 1 is removed using a cutter or the like (grinding work). Finally, the cushion 1 including the coating material 3 attached thereto is completed.

In particular, when the cushion 1 is manufactured using the manufacturing mold 4 of the present invention, a portion of the coating material 3 is formed on some portions of the cavities 6a of the second molds 6 to wrap inward along the upper side edges 2a of the cushion 1 because the portions of the cavities 6a are in contact with the bottom of the third molds 7. Accordingly, penetration of water into the cushion 1 through sides of an outwardly exposed portion of the cushion 1 of a completed shoe may be perfectly blocked.

The coating material 3 formed to wrap the upper side edges 2a of the cushion 1 is attached to the recessed portion A1 of the sole A so that dust or water cannot penetrate between the coating material 3 and sides of the cushion 1 when exposed to the outside. Accordingly, the function of the cushion 1 may be secured for a long time and contamination may be minimized.

The body 2 of the shoe cushion 1 of the present invention manufactured as described above is molded using a polyurethane (PU) resin having excellent resilience and elasticity as a main material. The body 2 is entirely wrapped with the coating material 3 made of a thermo polyurethane (TPU) resin, except for a portion of an upper surface of the body 2. The coating material-wrapped shoe cushion 1 is bonded and fixed to the recessed portion A1 of the sole A using a bond so that a shoe sole wherein sides of the cushion 1 exposed to the outside and the side edges 2a thereof are completely wrapped with the coating material 3 is completed.

Accordingly, since dust or water cannot penetrate into the coating material 3 and between sides of the cushion 1 even when the cushion 1 is exposed to the outside, a noise problem during walking generated when a cushion material, which has absorbed water, is compressed may be addressed. In addition, since sides of the cushion 1 exposed to the outside are protected by the coating material 3, the cushion 1 may be protected against contamination, discoloration, and cushion damage due to scratches, whereby endurance lifespan thereof may be greatly increased and a cushioning function and the like, as essential functions of the cushion 1, may be kept for a long time.

While the present invention has been described referring to the preferred embodiments, those skilled in the art will appreciate that many modifications and changes can be made to the present invention without departing from the spirit and essential characteristics of the present invention. Therefore, it should be understood that there is no intent to limit the disclosure to the embodiments disclosed, rather, the disclosure is to cover all modifications, equivalents, and alternatives falling within the spirit and scope of the disclosure as defined by the claims.

| Description of Reference numerals | | | |
|---|---|---|---|
| 1: cushion | 2: body | 2a: side edge | 3: coating material |
| 4: manufacturing mold | 5: first mold | 6: second molds | 6a: cavity |
| 7: third mold | 7a: cavity | 8: fourth mold | 9: air vent |
| 10: side mold | 11: step | A: sole | A1: recessed portion |

What is claimed is:

1. A mold (4) for manufacturing a shoe cushion (1), the mold (4) comprising:

a first mold (5);

a second mold (6) seated on the first mold (5) and configured to contain a first cavity (6a);

a third mold (7) seated on the second mold (6) and configured to contain a second cavity (7a), wherein the third mold (7) extends over the first cavity (6a) to form a step (11), wherein the second cavity (7a) is formed smaller than the first cavity (6a) of the second mold (6);

a fourth mold (8) seated on the third mold (7) and extending down into and fitting in the second cavity (7a), wherein the step (11) is located at the same level as a bottom of the fourth mold (8); and an air vent (9) extending from an outside of the mold (4) to under the first cavity (6a) and venting out air from the first cavity (6a) to the outside of the mold (4).

2. The mold (4) according to claim 1, wherein the second mold (6) and the third mold (7) are integrated into a single body, forming an integrated side mold (10), wherein the air vent (9) extends from the outside of the mold (4) through between the first mold (5) and the second mold (6) to under the first cavity (6a).

* * * * *